April 23, 1929.  A. M. MERTZANOFF  1,710,665
WATER HEATING APPARATUS
Filed July 19, 1926   3 Sheets-Sheet 1
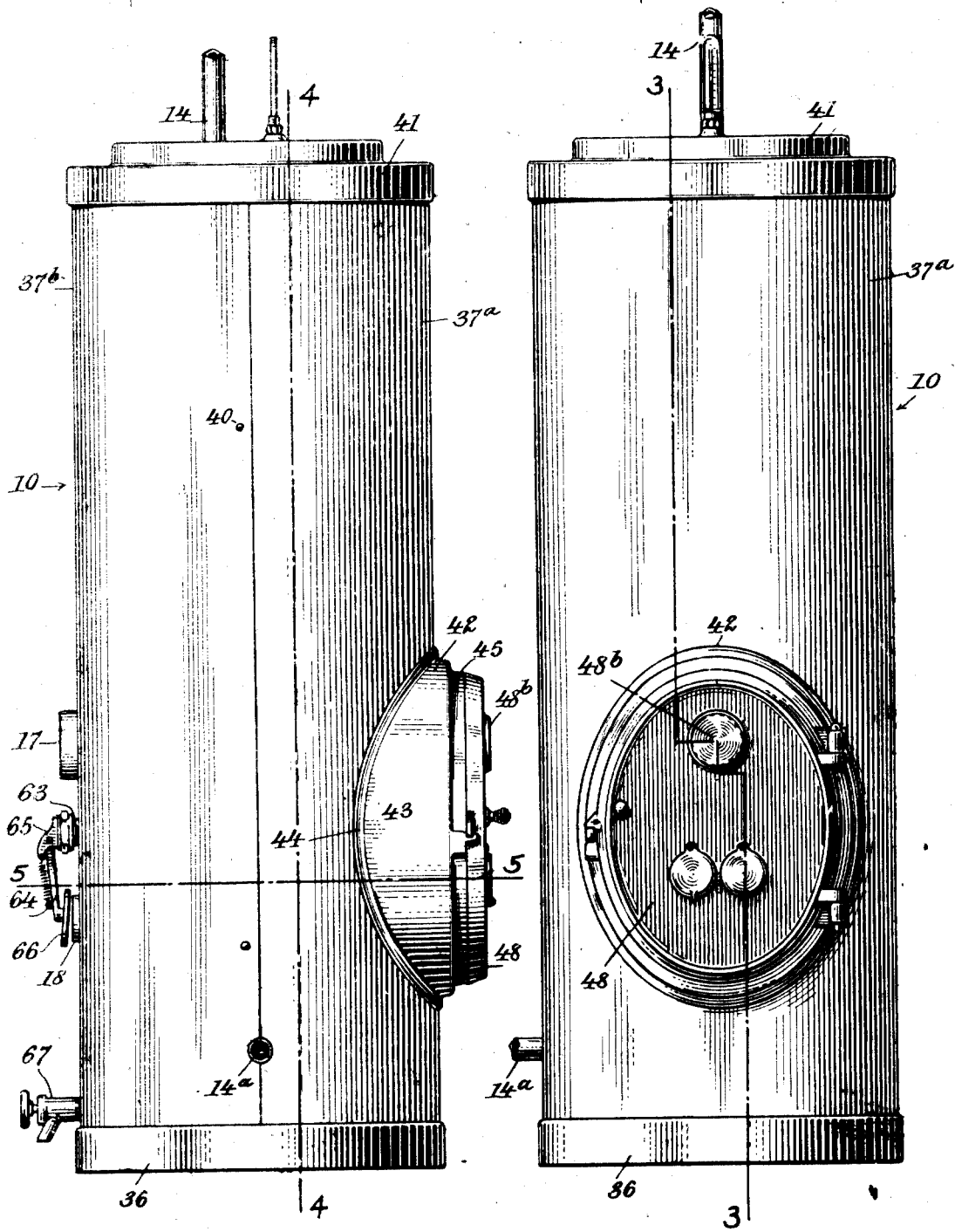

April 23, 1929.                A. M. MERTZANOFF                 1,710,665
                            WATER HEATING APPARATUS
                            Filed July 19, 1926           3 Sheets-Sheet 2
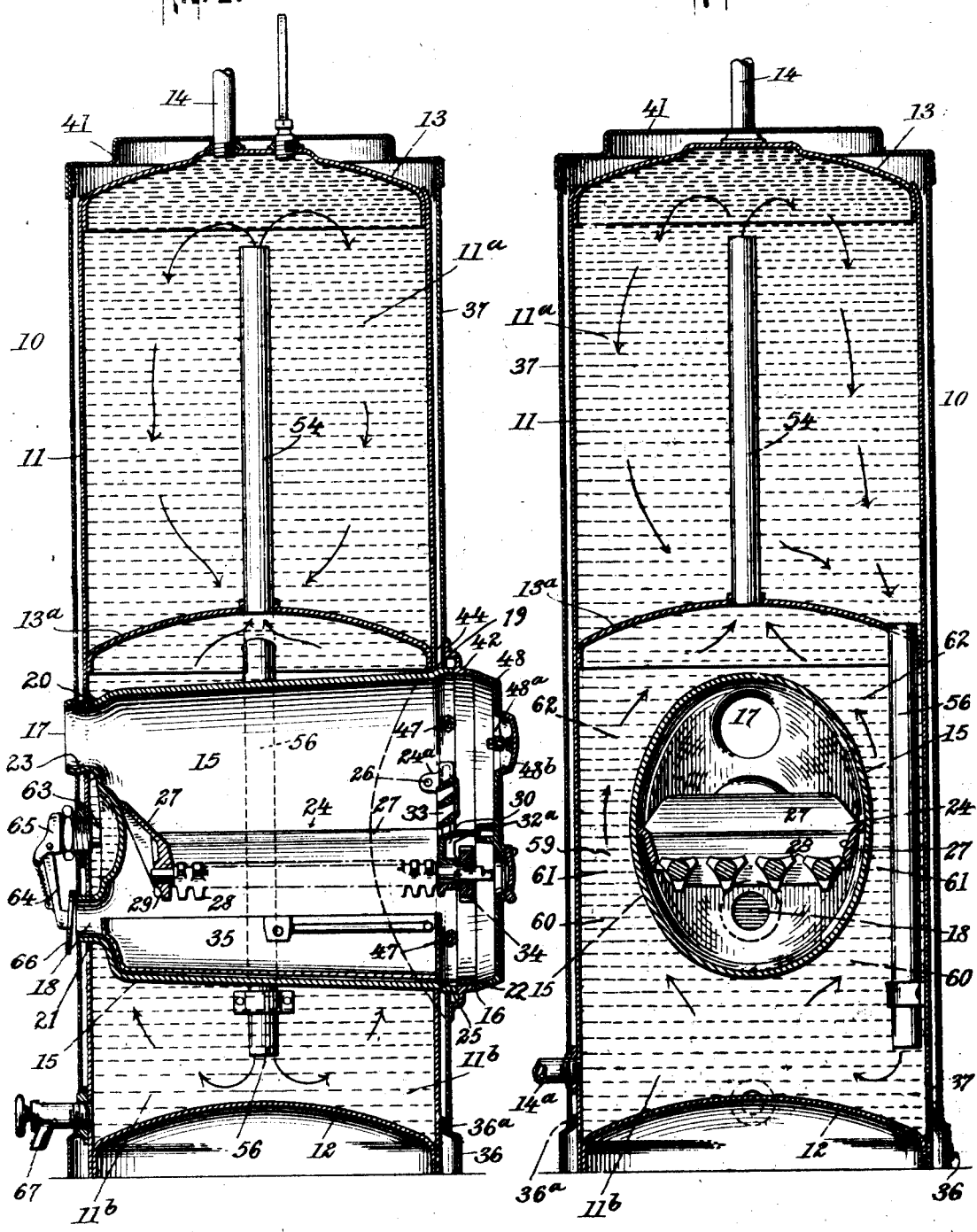
INVENTOR
André M. Mertzanoff
BY
Conrad A. Dieterich
his ATTORNEY April 23, 1929.  A. M. MERTZANOFF  1,710,665
WATER HEATING APPARATUS
Filed July 19, 1926  3 Sheets-Sheet 3
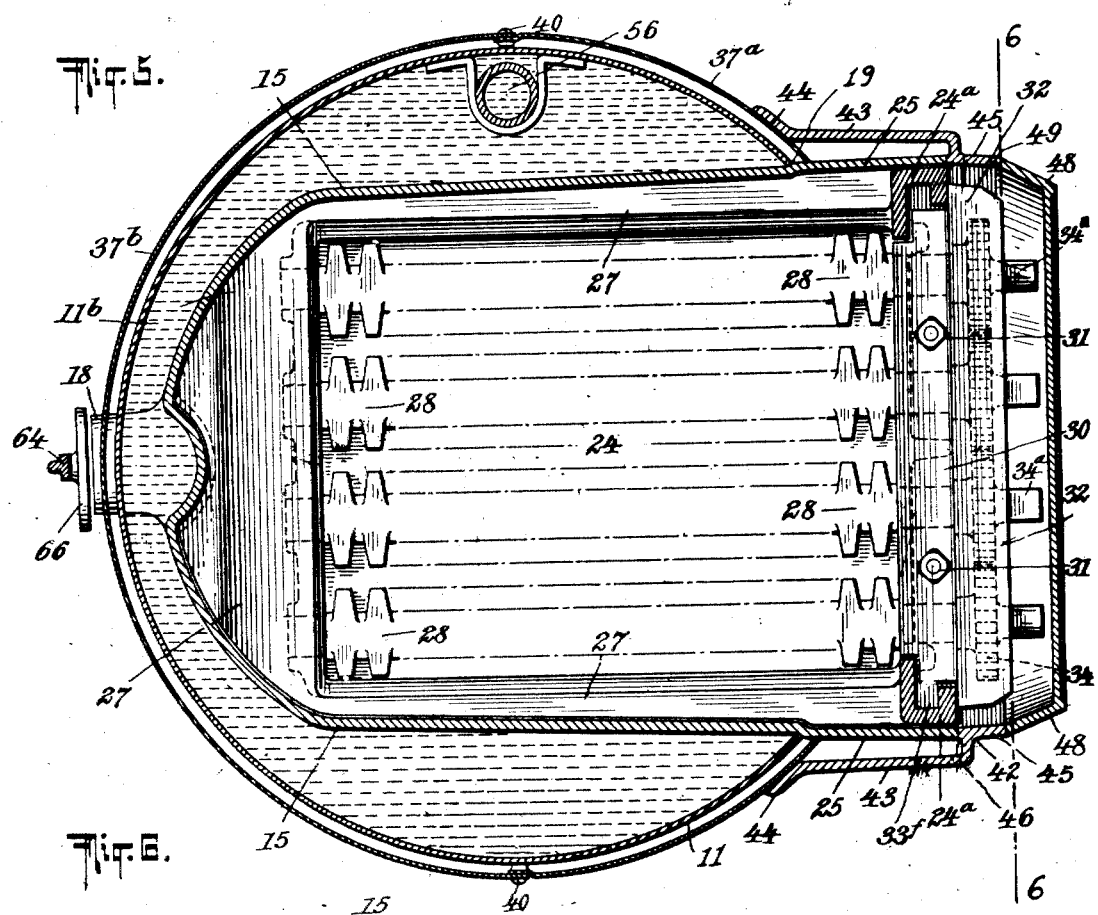
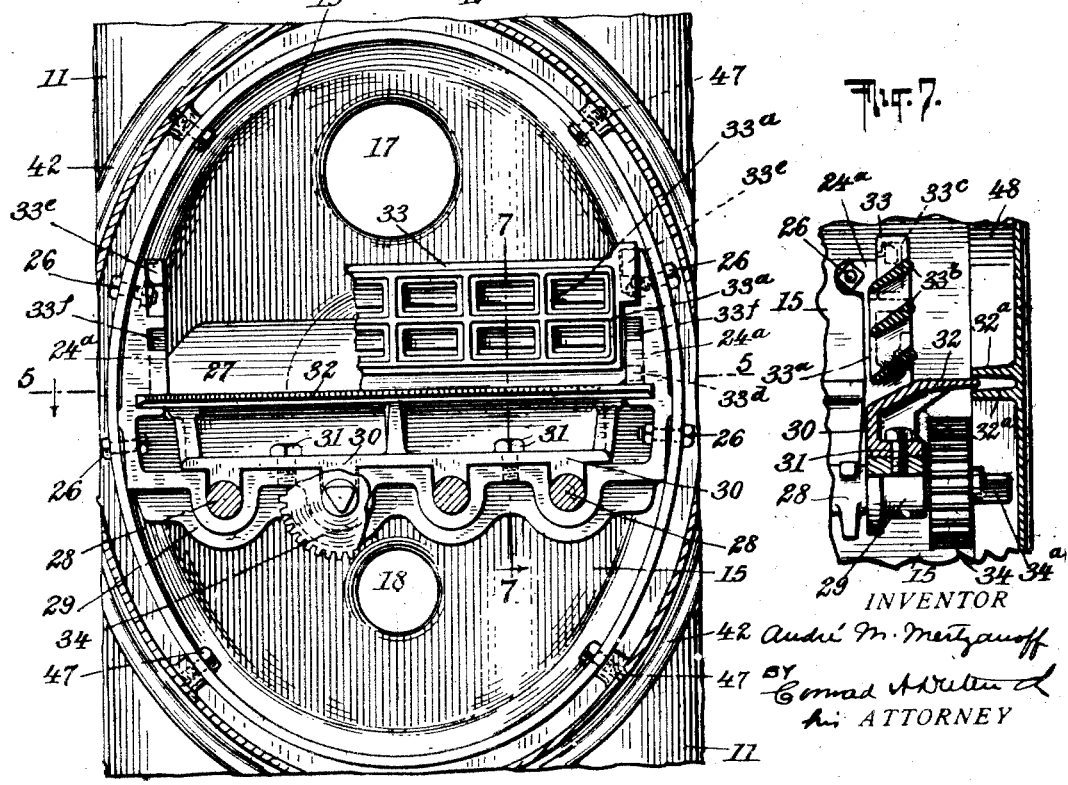
INVENTOR
André M. Mertzanoff
BY Conrad A. Weber
his ATTORNEY Patented Apr. 23, 1929.

1,710,665

UNITED STATES PATENT OFFICE.

ANDRÉ M. MERTZANOFF, OF NEW YORK, N. Y., ASSIGNOR TO AMERICAN RADIATOR COMPANY, OF NEW YORK, N. Y., A CORPORATION OF NEW JERSEY.

WATER-HEATING APPARATUS.

Application filed July 19, 1926. Serial No. 123,265.

My invention relates to improvements in heating means for hot water supply tanks, and the same has for its object to provide a simple, inexpensive and efficient apparatus for providing a constant supply of hot water.

Further, said invention has for its object to provide an apparatus of the character specified which is compact in construction, neat in appearance, and capable of producing the maximum quantity of hot water with the minimum consumption of fuel.

Further, said invention has for its object to provide an apparatus of the character specified comprising essentially a receptacle to receive the water to be heated, and a heating member disposed transversely of said receptacle adjacent to the lower end thereof.

Further, said invention has for its object to provide an apparatus of the character specified comprising a receptacle to receive the water to be heated, and a fuel receptacle disposed therein with its ends supported by the walls of said receptacle, and its intermediate wall portions free from the walls of said first-named receptacle to permit of the due circulation of the water.

Further, said invention has for its object to provide an apparatus of the character specified comprising a receptacle for the water to be heated, and a fuel receptacle extending transversely through said first-named receptacle and having its ends extending through opposite wall portions thereof and secured thereto in fluid-tight relation.

Further, said invention has for its object to provide an apparatus of the character specified comprising a receptacle adapted to receive the water to be heated, and a fuel receptacle formed as an integral or unitary structure extending transversly through said first named receptacle and secured at its opposite ends, exteriorly of said first named receptacle, to the walls thereof.

Further, said invention has for its object to provide an apparatus of the character specified in which the heating member or element is so constructed and so arranged and secured within the water containing receptacle that the greatest possible outer surface of said heating member or element will be exposed to, and be in direct contact with the water to be heated.

Further, said invention has for its object to provide an apparatus of the character specified in which the wall portions of the fuel receptacle are of such form and contour that the water, as it becomes heated and follows its natural course, will be caused to impinge upon or contact closely with said wall portions in its passage through the apparatus.

Further, said invention has for its object to provide an apparatus of the character specified in which the water receiving receptacle or tank is divided into a plurality of communicating compartments of relatively different capacities, and a fuel receptacle disposed within the compartment containing the smaller volume of water whereby to insure the rapid and efficient heating of the water and to accelerate the circulation thereof.

Further, said invention has for its object to provide an apparatus of the character specified in which the fuel receptacle has a portion of the front edge of its forward or open end extending outwardly beyond the wall of the receptacle to provide means for securement thereto of the door or closure and its associated parts, wholly without the receptacle, in order to avoid the perforating of the water containing receptacle which might tend to render the same more readily subject to corrosion and leakage.

Further, said invention has for its object to provide an apparatus of the character specified in which the water containing receptacle or tank is surrounded by a jacket disposed in spaced relation thereto and confining between the same and said receptacle a layer of dead air serving as an insulating medium for maintaining the exterior of the apparatus cool, and for conserving the heat generated therein for the purpose of heating the water.

Further, said invention has for its object to provide an apparatus of the character specified in which the heat emitting element is formed as a unitary element having its wall portions curved to follow the normal direction of the flow of the heated water.

Other objects will in part be obvious, and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings forming part of the specification,

Figure 1 is a side elevation showing one form of hot water supply heater constructed according to, and embodying my said invention;

Fig. 2 is a front elevation thereof;

Fig. 3 is a central section taken on the line 3—3 of Fig. 2;

Fig. 4 is a central section taken on the line 4—4 of Fig. 1;

Fig. 5 is an enlarged transverse section on the line 5—5 of Fig. 1; and

Fig. 6 is a front elevation partly in section of the fire pot and grate taken on the line 6—6 of Fig. 5, and Fig. 7 is a detail sectional view of the line 7—7 of Fig. 6.

In said drawings 10 designates the apparatus as a whole comprising a cylindrical receptacle or tank 11 having a raised, concave bottom 12, a convex top 13, and an intermediate transverse partition or diaphragm 13$^a$ which serves to divide the interior of said receptacle into upper and lower compartments or chambers 11$^a$, 11$^b$. The said receptacle 11 is provided at its top with a hot water outlet 14, and at its side, adjacent to the lower end thereof, with a cold water supply inlet 14$^a$.

Within the lower compartment 11b of the receptacle or tank 11 is disposed the heating member or element comprising a relatively smaller container 15 constituting the fuel receptacle, combustion chamber and ash pit.

The said fuel receptacle 15 is oval or elliptical in form, and preferably constructed of one piece of material or integrally, of drawn sheet steel.

The fuel receptacle 15 has at its front end a single opening 16 which serves as the fuel supply and ash pit openings, and is substantially coextensive in area with that of said fuel receptacle. The fuel receptacle 15 is provided at its rear end with projecting tubular portions forming a smoke outlet 17, and a fresh air inlet 18 through which is admitted the primary air necessary to support combustion.

The receptacle 11 is provided in its front with a large opening 19 for receiving the front end of the fuel receptacle 15, and at its rear with smaller openings 20 and 21 for receiving the tubular portions 17 and 18 of the fuel receptacle. The fuel receptacle 15 extends transversely of the receptacle 11, and is directly supported in said openings by the opposite wall portions of the receptacle 11. The opposite ends of the fuel receptacle 15 project beyond the wall portions of the receptacle 11, and are secured adjacent to their ends along the edges of the several openings 19, 20, 21 by welding or otherwise to form fluid-tight joints. Preferably, the front end of the fuel receptacle 15, as indicated at 22, and the tubular portion 17, as indicated at 23, are expanded in order to further secure the fuel receptacle in position within the receptacle 11.

Disposed within the fuel receptacle 15 is the grate bar frame or basket 24 having vertical end portions 24$^a$ at the front thereof. The frame 24 is secured at its forward end to the forwardly projecting portion 25 of the fuel receptacle 15, exteriorly of the water backed portions thereof, by bolts or screws 26 passing through said end portions 24$^a$ and into said projecting portion 25. The sides and back of the frame 24 consist of upwardly and outwardly inclined wall portions 27 forming a hopper to receive the fuel, and engaging the walls of the fuel receptacle to support the frame 24 in position therein; the rear portions of the frame 24 being free to permit of movement thereof relative to the fuel receptacle to allow for expansion. The grate bars 28 are supported at their ends in the bearings 29 formed in the grate frame 24. A trunnion plate 30 secured to the front end of the frame 24 by the bolts 31 serves to removably retain the front ends of the grate bars 28 in position upon said frame 24. The plate 30 is provided with a forwardly projecting portion or flange portion 32 adapted to extend between a cooperating pair of flanges 32$^a$ upon the inner side of the door 48 for controlling the fuel opening 16, whereby to form a barrier between the fuel support and the ash pit. The reduced forwardly projecting ends of the grate bars 28 are interconnected by suitable gearing 34, and one of said ends is provided with a polygonal portion 34$^a$ to be engaged by an operating handle.

In order to render it possible to obtain a maximum fuel capacity and maintain a deep bed of fuel upon the grate, a grill or louvre frame 33 is removably supported between the vertically extending side portions 24$^a$, and comprises side members 33$^a$ united by inclined transverse members 33$^b$. The side members 33$^a$ are provided adjacent to their upper ends with sockets 33$^c$, and adjacent to their lower ends with studs 33$^d$, adapted to engage, respectively, with the studs 33$^e$ and the sockets 33$^f$ provided upon each of the adjacent side portions 24$^a$. An ash pan 35 is disposed below the grate for receiving the ashes.

An annular base member 36, having a reduced upper portion 36$^a$ is disposed round the lower end of the receptacle 11 and is suitably secured thereto. A jacket 37 is supported upon said reduced portion 36$^a$, and is disposed around the receptacle 11, in spaced relation thereto, to form an annular space between the receptacle 11 and the jacket 37 to confine a layer of dead air serving as an insulating medium for maintaining the exterior of the apparatus cool, and for reducing heat losses by radiation.

The jacket 37, to permit of the ready assembly thereof, is preferably formed in two vertical parts or sections, viz: a front section 37ª having an opening therein to receive the projecting portion 25 of the fuel receptacle 15, and a rear section 37ᵇ having openings therein to receive the constricted rear portions 17 and 18 of said fuel receptacle 15. The sections 37ª and 37ᵇ, when assembled, overlap at the opposite sides of the heater and are secured together by suitable fastening devices 40. The lower edge of the jacket 37 rests on the base ring 36, which serves to space the same uniformly relative to the receptacle 11, and to seal the lower end of the space in which the dead air is confined. The upper end of the jacket 37 includes a cover 41 whereby the receptacle 11 is completely enclosed.

Disposed around the combined fuel and ash-pit opening 16 is the door frame 42, comprising a flared intermediate portion 43 adapted to be disposed around the projecting portion 25 of the fuel receptacle 15, and an inner portion 44 conforming closely in contour to the cylindrical surface of the jacket 37. The outer portion 45 of said door frame is of reduced cross section, and has an inner rib or edge 46 thereon in engagement with the entire outer edge of the fuel receptacle 15. The frame 42 is secured to the projecting portion 25 of the fuel receptacle by bolts 47, or the like. A door 48 is hinged upon the frame 42 for closing the combined fuel and ash pit opening 16. The contacting edges 49 of the door 48 and frame 42 are preferably ground so that when said door is closed, a gas tight closure is provided, and cleanliness in operation is insured. The door 48 is provided with an air inlet opening 48ª controlled by the rotatable closure 48ᵇ adapted to be moved in and out to control the amount of air permitted to enter the opening 48ª in order to check the rate of combustion. When the door 48 is closed, the flanges 32, 32ª cooperate to prevent any appreciable amount of air, which passes through the opening 48ª, from entering the ash pit.

To accelerate the circulation of water within the receptacle 15, and the compartments 11ª, 11ᵇ, in the lower of which the fuel receptacle and combustion chamber 15 is disposed and surrounded by the water therein, the diaphragm 13ª is provided with a central intake opening in which is secured the lower end of a vertical flow pipe 54 whose upper or outlet end communicates with the upper central portion of the compartment 11ª. A second pipe 56 for the return of the relatively cooler water is arranged in the lower compartment 11ᵇ in close proximity to wall thereof. The upper or intake end of said pipe 56 is secured to the diaphragm 13ª and communicates with the lower portion of the upper compartment 11ᵇ, and the lower or outlet end of said pipe 56 terminates adjacent to the base of said lower compartment, and at a point below the fuel receptacle 15.

As the water surrounding the fuel receptacle 15 becomes heated the same passes through the pipe 54 into the compartment 11ª, and the relatively cooler water in said compartment 11ª descends through the pipe 56 into the lower part of the compartment 11ᵇ. The diaphragm 13ª serves to direct the more highly heated water to and through the pipe 54, and permits of the unimpeded descent of the cooler water through the pipe 56.

The space between the curved wall portions of the heating element or fuel receptacle 15 and the adjacent wall portions of the receptacle 11 provide passages 59 for the water to be heated. The wall portions of the fuel receptacle 15 adjacent to, or directly above the lower portions of said passages 59 are nearest to the walls of the receptacle or tank 11, and then curve gradually inwardly toward the top of said heating element 15 where the same merge, and at which point it is hottest. By this construction and arrangement of parts each passage 59 has a wide lower or entrance portion 60, a constricted intermediate portion 61, and a relatively wide or flaring upper or exit portion 62. The water will thus be slightly heated and expanded upon entering the wide lower or entrance portion 60, and become progressively heated and expanded, and its rate of flow correspondingly increased as it successively passes through the constructed intermediate portion 61 and upper outlet portion 62 by its contact with and closely following the curved wall portions of said fuel receptacle 15, and finally pass in highly heated state into and through the pipe 54, and be discharged into the upper portion of the upper compartment or chamber 11ª. The fuel receptacle 15 is preferably elliptical in cross section to cause the water, in following its natural or normal course towards the central inlet 53 in the diaphragm 13ª to impinge upon or contact closely with the wall portions of said fuel receptacle.

The receptacle 11 is provided between the smoke outlet 17 and the draft inlet 18 with an opening in which is secured a thermostatic element 63 whose inner end extends into the water in the receptacle 11. A spring controlled lever 64, pivotally supported at its upper end in bearings 65, provided upon the element 63 is operatively associated at its upper end with said thermostatic element, and at its lower end carries a flat circular plate 66 adapted to seat upon the outer end of the tubular portion 18 whereby automatically to control the supply of fresh air entering the ash pit through said tubular portion 18.

The receptable or tank 11 may be provided at a suitable point near the bottom with a drawoff cock or drain 67.

The operation of the apparatus will be largely obvious from the foregoing description. It is merely to be noted that when the apparatus is in operation the door 48 is tightly closed, and that the entire supply of air necessary to support the combustion of the fuel is admitted below the grate through the fresh air supply opening 18, and that the volume of air admitted is automatically controlled by the damper plate 66 which is operated by the thermostatic element 63, in response to temperature variations of the water in the receptacle 11. In operation the thermostatic element 63 and damper plate 66 will supply the air necessary to support the combustion of the fuel at such rate as may be necessary to maintain the water, under normal operating conditions, uniformly heated to the temperature desired.

Further, it is to be noted that by means of the construction of the apparatus according to my said invention, the door for the fuel receptacle and the supporting frame therefor are secured in position upon the projecting portion of said fuel receptacle wholly without the water containing receptacle thereby rendering it unnecessary to perforate or drill any part of the fuel receptacle exposed to water in order to provide for the reception of bolts or rivets, and as a result all possibility of water accidently entering said fuel receptacle and extinguishing the fire is eliminated.

Further, it is to be noted that as the fuel receptacle is substantially wholly surrounded by water, all danger of the same becoming overheated or burned out is prevented.

Further, it is to be noted that as the grate and its associated parts are positively secured only at their forward ends to the fuel receptacle, the same are capable of expansion and contraction therein, in response to temperature variations, without danger of straining or injuring any of said parts.

Having thus described my invention, what I claim and desire to secure by Letters Patent is:

1. An apparatus of the character described comprising a receptacle adapted to receive water to be heated, and an integrally-formed elliptical fuel receptacle having an opening at one end thereof common to the fuel receiving portion and ash-pit, and tubular portions at the opposite end thereof providing draft and air supply openings; said fuel receptacle being surrounded by the water in said first-named receptacle and extending transversely of said first-named receptacle through opposite wall portions thereof, and secured thereto in fluid-tight relation, substantially as specified.

2. An apparatus of the character described comprising a receptacle adapted to receive water to be heated, a partition disposed transversely within said receptacle dividing said receptacle into upper and lower compartments, a heating element in the lower of said compartments surrounded by the water therein, and a conduit disposed centrally within said receptacle and having its intake end communicating with said lower compartment above said heating element therein and its outlet end adjacent to the upper end of said upper compartment, and a conduit extending through said partition adjacent to the wall of said receptacle and having its intake end disposed adjacent to said partition and its outlet end disposed in said lower compartment and terminating below said heating element, substantially as specified.

3. An apparatus of the character described comprising a receptacle adapted to receive water to be heated, a partition disposed transversely within said receptacle dividing said receptacle into upper and lower compartments, a heating element disposed within the lower of said compartments and surrounded by the water therein, a vertical conduit disposed centrally within said receptacle and communicating at its opposite ends with the upper portion of each of said compartments, and a vertical conduit disposed within said receptacle in proximity to the wall thereof and communicating at its opposite ends with the lower portion of each of said compartments, substantially as specified.

4. An apparatus of the character described comprising a receptacle adapted to receive water to be heated, a partition disposed transversely within said receptacle dividing said receptacle into upper and lower compartments; said partition having a central opening therein, a fuel receptacle disposed in the lower of said compartments and surrounded by the water therein; said fuel receptacle having curved wall portions forming with the adjacent wall portions of said first-named receptacle vertically extending passages having constricted intermediate portions and relatively wide upper and lower portions, and a return conduit extending through said partition in proximity to the wall of said first-named receptacle and having its intake end arranged in the upper compartment and its outlet end arranged in said lower compartment below the base of said fuel receptacle, substantially as specified.

5. An apparatus of the character described comprising a cylindrical receptacle adapted to receive water to be heated, a partition disposed transversely within said receptacle dividing said receptacle into upper and lower compartments, an integrally-formed, elliptical fuel receptacle disposed transversely within said lower compartment, and projecting through the opposite wall portions of said first-named receptacle and secured thereto in fluid-tight relation; the adjacent wall portions of said fuel receptacle and of said first-named receptacle providing therebetween vertical passages for the water to be heated having constricted intermediate portions and relatively wide upper and lower portions, a vertical conduit disposed centrally within said first-named receptacle having its intake end arranged in said lower compartments above said fuel receptacle and its outlet end arranged adjacent to the top of said upper compartment, and a vertical conduit disposed in said first-named receptacle in proximity to the wall thereof and having its intake end arranged in the lower portion of said upper compartment and its outlet end arranged in said lower compartment below said fuel receptacle, substantially as specified.

6. An apparatus of the character described, comprising a receptacle adapted to receive water to be heated, a fuel receptacle disposed transversely within said first-named receptacle and having an open front end projecting outwardly from said first-named receptacle and a closed rear end, tubular portions extending from said closed end and through said first-named receptacle; one of said tubular portions communicating with the combustion chamber and serving as a smoke outlet, and the other of said tubular portions communicating with said fuel receptacle below the grate and serving as a fresh air inlet, and a separate fuel supporting member disposed within said fuel receptacle and secured to the projecting portion thereof, substantially as specified.

7. An apparatus of the character described, comprising a receptacle adapted to receive water to be heated, a fuel receptacle disposed transversely within said first-named receptacle and having an open front end projecting outwardly from said first-named receptacle and a closed rear end, integral tubular portions arranged one above the other and extending outwardly from said closed end and through said first-named receptacle; the upper of said tubular portions of said closed end communicating with the combustion chamber and serving as a smoke outlet, and the lower of said tubular portions communicating with said fuel receptacle below the grate and serving as a fresh air inlet, and a separate fuel supporting member disposed within said fuel receptacle and secured to the projecting portion thereof, substantially as specified.

Signed at the city of New York, in the county and State of New York, this 13th day of May, one thousand nine hundred and twenty-six.

ANDRÉ M. MERTZANOFF.